United States Patent
De Morais et al.

(10) Patent No.: US 11,359,700 B2
(45) Date of Patent: Jun. 14, 2022

(54) TRANSMISSION HAVING AT LEAST A FIRST AND A SECOND PLANETARY TRANSMISSION STAGE

(71) Applicant: SEW-EURODRIVE GMBH & CO. KG, Bruchsal (DE)

(72) Inventors: Elvia Cristiano De Morais, Indaiatuba-SP (BR); Antonio Ventriglia Vieira, Salto-SP (BR)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 0 days.

(21) Appl. No.: 17/277,517

(22) PCT Filed: Aug. 28, 2019

(86) PCT No.: PCT/EP2019/025286
§ 371 (c)(1),
(2) Date: Mar. 18, 2021

(87) PCT Pub. No.: WO2020/057776
PCT Pub. Date: Mar. 26, 2020

(65) Prior Publication Data
US 2022/0034383 A1      Feb. 3, 2022

(30) Foreign Application Priority Data
Sep. 18, 2018   (DE) .......................... 102018007355.7

(51) Int. Cl.
*F16H 1/46*      (2006.01)
*F16H 57/04*     (2010.01)
*F16H 57/08*     (2006.01)

(52) U.S. Cl.
CPC ............. *F16H 1/46* (2013.01); *F16H 57/043* (2013.01); *F16H 57/0479* (2013.01); *F16H 57/0486* (2013.01); *F16H 57/082* (2013.01)

(58) Field of Classification Search
CPC ...... F16H 1/46; F16H 57/043; F16H 57/0479; F16H 57/0486; F16H 57/082
See application file for complete search history.

(56) References Cited

U.S. PATENT DOCUMENTS 4,365,525 A    12/1982  Imazaike
5,616,097 A    4/1997   Dammon
(Continued)

FOREIGN PATENT DOCUMENTS

DE        19546330 C1  *  3/1997  ........... F16H 57/021
DE     202011102802 U1    12/2011
(Continued)

OTHER PUBLICATIONS

International Search Report issued in corresponding International Application No. PCT/EP2019/025286, dated Oct. 30, 2019, pp. 1-2, English Translation.
(Continued)

*Primary Examiner* — Justin Holmes
(74) *Attorney, Agent, or Firm* — Carter, DeLuca & Farrell LLP

(57) ABSTRACT

A transmission includes at least a first and a second planetary transmission stage. The first planetary transmission stage has a first planet-gear carrier including bolts on which first planets which mesh with a first sun gear are rotatably mounted, and the second planetary transmission stage has a second planet-gear carrier including bolts on which second planets which mesh with a second sun gear are rotatably mounted. The first planet-gear carrier is connected to the second sun gear in a torsionally fixed manner, and a disk is accommodated centrally in the first planet-gear carrier in a recess, e.g., in an axially uninterrupted recess, which is situated axially between the first sun gear and the second sun gear.

20 Claims, 4 Drawing Sheets

(56) References Cited

U.S. PATENT DOCUMENTS

| | | | |
|---|---|---|---|
| 10,495,206 B2* | 12/2019 | Zhu | F16H 55/06 |
| 2016/0025187 A1* | 1/2016 | Stoakes | F16H 1/48 |
| | | | 475/331 |
| 2016/0025208 A1* | 1/2016 | McKinzie | F16H 57/0482 |
| | | | 475/159 |

FOREIGN PATENT DOCUMENTS

| | | | |
|---|---|---|---|
| DE | 102013222731 A1 * | 5/2015 | ............ F16H 48/11 |
| DE | 102015006023 A1 | 11/2016 | |
| EP | 2479458 A1 | 7/2012 | |
| JP | 2016125506 A | 7/2016 | |
| KR | 1020150001335 A | 1/2015 | |

OTHER PUBLICATIONS

Written Opinion of the International Search Authority issued in corresponding International Application No. PCT/EP2019/025286, dated Oct. 30, 2019, pp. 1-8, English Translation.

* cited by examiner

TRANSMISSION HAVING AT LEAST A FIRST AND A SECOND PLANETARY TRANSMISSION STAGE

FIELD OF THE INVENTION

The present invention relates to a transmission having at least a first and a second planetary transmission stage.

BACKGROUND INFORMATION

In certain conventional planetary transmission stages, planets mesh with an internally toothed ring gear and an externally toothed sun gear.

Japanese Patent Document 2016-125506 describes a planetary transmission.

German Patent Document No. 10 2015 006 023 describes a transmission having an input shaft mounted in a flange part with the aid of a bearing.

German Patent Document No. 20 2011 102 802 describes a thrust ring.

Korean Patent Document No. 10-2015-0001335 describes a method for reducing the friction between a pinion and a housing.

SUMMARY

Example embodiments of the present invention provide a transmission in which a long service life with a compact configuration of the transmission is able to be achieved.

According to an example embodiment of the present invention, a transmission includes at least a first and a second planetary transmission stage. The first planetary transmission stage has a first planet-gear carrier including bolts on which first planets which are meshing with a first sun gear are rotatably mounted, and the second planetary transmission stage has a second planet-gear carrier including bolts on which second planets which are meshing with a second sun gear are rotatably mounted. The first planet-gear carrier is connected to the second sun gear in a torsionally fixed manner, and a disk is accommodated centrally in the first planet-gear carrier in a recess, e.g., in an axially uninterrupted recess, which is situated axially between the first sun gear and the second sun gear.

This has the advantage that the disk may be used as a spacer so that the two sun gears are able to be kept at a distance from each other, which extends the service life. As a result, only an axially thin disk has to be interposed so that a compact configuration is achieved. The disk may also be used to improve the lubricant supply, with the result that the service life of the transmission is increased for this reason as well.

According to example embodiments, the first and/or the second sun gear has/have a hollow configuration. This offers the advantage that lubricating oil travels through the sun gears to the disk where it passes through the hole situated in the center of the disk, so that a radially extending channel is able to be used as a lubricant channel.

According to example embodiments, the disk is situated coaxially to the first and/or the second sun gear. This is considered advantageous insofar as the system is balanced. In addition, the axis of rotation penetrates the hole situated in the center of the disk and thus allows for a continuous lubricant supply. In contrast, without the central positioning, a continuous lubricant supply would not be reliably ensurable.

According to example embodiments, the radial clearance range covered by the disk includes the radial clearance range covered by the first sun gear, e.g., the radial clearance range covered by the disk, includes the radial clearance range covered by the second sun gear or overlaps with it. This has the advantage that complete protection against mutual contact between the two sun gears is able to be ensured.

According to example embodiments, the disk is retained in the first planet-gear carrier by force locking, e.g., with the aid of a snap ring. This has the advantage that a simple and economical fastening method can be used.

According to example embodiments, the first planet-gear carrier has an axially uninterrupted stepped bore, the disk resting against a first step of the stepped bore, e.g., a bearing of a first planet resting against a second step of the stepped bore. This offers the advantage that a secure fastening of the disk is achievable. In addition, on the side of the disk facing away from the first step, the first sun gear rests against the disk. Therefore, the disk is pressed against the first step and thus securely retained.

According to example embodiments, the disk is made from steel and is subjected to a nitriding treatment. This is considered advantageous insofar as a simple production and low coefficients of friction are achievable.

According to example embodiments, the disk has a centrally situated, axially uninterrupted hole. This offers the advantage that lubricating oil passes through the hole, i.e., without the influence of a centrifugal force. This is because with the negligible radial clearance, the centrifugal force vanishes as well.

According to example embodiments, one or more depression(s) is/are provided on the side of the disk facing the first sun gear, which extend(s) from the centrally situated, axially uninterrupted hole to the radially outer edge of the disk, e.g., so that a channel is formed in each case, which is restricted by the disk and the first sun gear, the depressions and/or channels in particular being set apart from one another at regular intervals in the circumferential direction. This offers the advantage that lubricating oil passes through the hole and is then radially conveyable. This allows for an uncomplicated lubrication of the planets disposed at a non-vanishing radial clearance, e.g., their needle bearings, because the planets are mounted with the aid of needle bearings which are slipped over the bolts of the planet-gear carrier.

According to example embodiments, the channel cross-section initially becomes larger as the radial clearance increases, and then decreases. This has the advantage that the channel cross-section, which increases up to a maximum value as the radial clearance grows larger, creates a buffer volume which allows for a steady outflow at an even greater radial clearance also with a fluctuating filling with lubricating oil because the channel cross-section decreases again from the maximum value when the radial clearance becomes larger again. The channel then terminates at this greater radial clearance in the direction of the planets, e.g., in the direction of their bearings.

According to example embodiments, the transmission has a third planetary transmission stage having a third planet-gear carrier including third bolts on which third planets which are meshing with a third sun gear are rotatably mounted. The third planetary-gear carrier is connected to the first sun gear in a torsionally fixed manner, and a further disk is centrally accommodated in the third planet-gear carrier in a recess, e.g., in an axially uninterrupted recess, which is situated axially between the first sun gear and the third sun gear, the third sun gear being arranged as a solid part, i.e., not being hollow. This offers the advantage that a further disk is situated axially upstream from the first sun gear shaft, which has a configuration similar to the previously mentioned disk but rests against a third sun gear shaft, which is implemented as a solid part. As a result, no transport of lubricating oil is possible in the axial direction through the further disk and the third sun gear shaft. Instead, the lubricating oil has to be transported through a further depression of the additional disk in the radially outward direction toward a bearing. The corresponding further hole of the further disk thus terminates only in the channel formed by the further depression but not also in a channel that passes axially through the third sun gear shaft.

For example, the further disk is situated coaxially to the first and/or third sun gear. The radial clearance range covered by the further disk, for example, includes the radial clearance range covered by the third sun gear. More specifically, the radial clearance range covered by the further disk includes the radial clearance range covered by the third sun gear or overlaps with it. The further disk, for example, is retained in the third planet-gear carrier by force locking, e.g., with the aid of a further snap ring. The third planet-gear carrier, for example, has an axially uninterrupted further stepped bore, and the further disk rests against a first step of the further stepped bore, e.g., a bearing of a third planet rests against a second step of the further stepped bore.

For example, the further disk is made from steel and is subjected to a nitriding treatment.

The further disk, for example, has a centrally situated, axially uninterrupted hole.

For example, one or more further depression(s) is/are provided on the side of the further disk facing the third sun gear, which extend(s) from the centrally situated, axially uninterrupted further hole to the radially outer edge of the further disk in each case, e.g., such that a further channel is formed which is restricted by the further disk and the third sun gear, e.g., the further depressions and/or the further channels are set apart from one another at regular intervals in the circumferential direction.

For example, the channel cross-section of the further channel initially increases as the radial clearance becomes larger, and then decreases.

For example, the hole of the further disk terminates in the further depression and/or in the further channel, e.g., so that lubricating oil that has entered through the hole of the further disk is conveyed through the further channel in the radially outward direction rather than axially through the third sun gear.

According to example embodiments, the respective planet-gear carrier has on its radially outer circumference in a circumferential position, i.e., for example, in a first circumferential angular range, a radially inwardly directed depression, e.g., a notch, which has an axially uninterrupted configuration. Monitoring of the rotational speed is therefore possible with the aid of a sensor positioned in the transmission interior.

Further features and aspects of example embodiments of the present invention are described in greater detail below with reference to the appended schematic Figures.

DETAILED DESCRIPTION

As schematically illustrated in the Figures, the transmission has planetary gear stages with sun gears between which a disk 3 is axially interposed.

Figure 1:
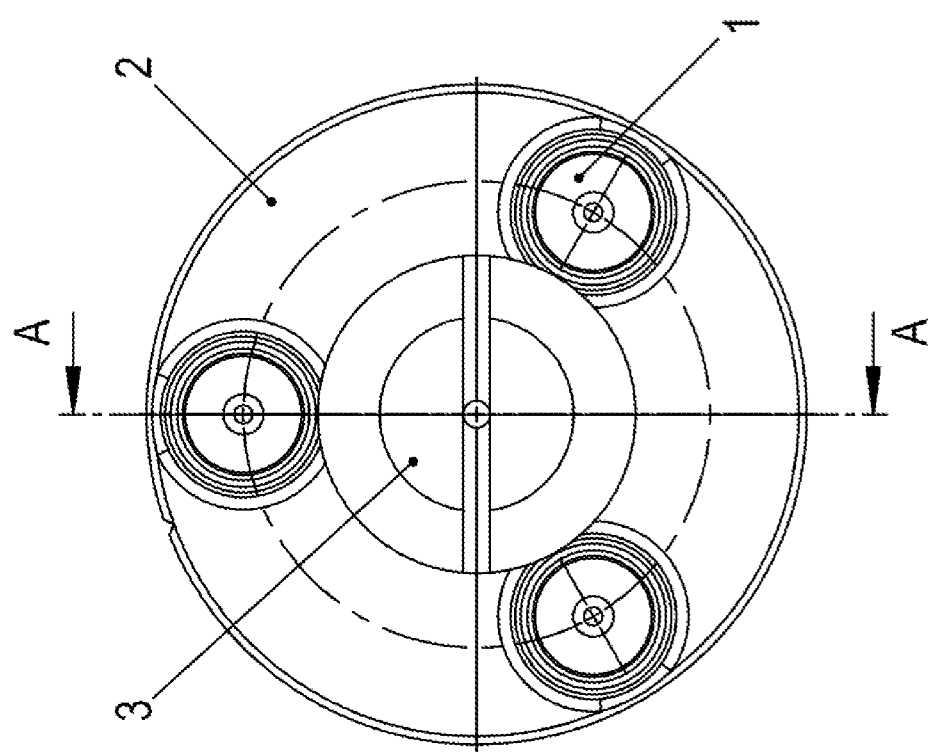
FIG. 1 is a top view of a planet-gear carrier 2 of a transmission according to an example embodiment of the present invention including a disk 3.
Figure 4:
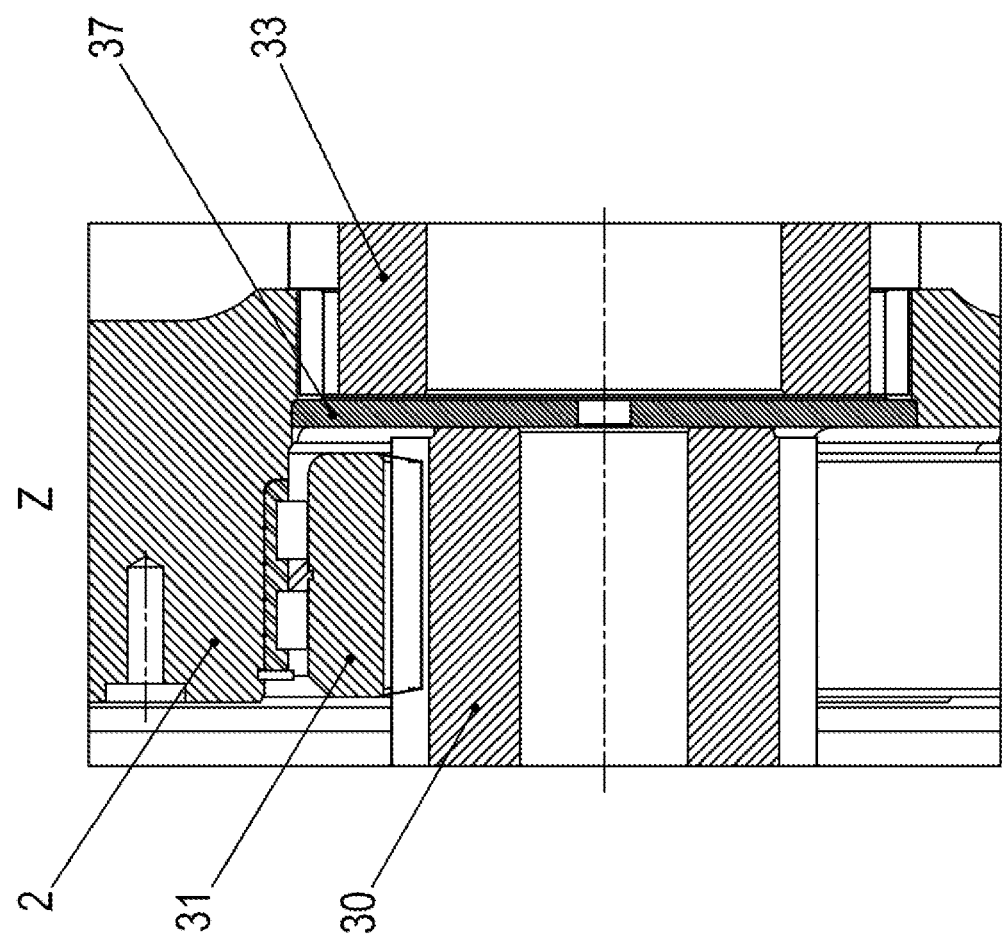
FIG. 4 is an enlarged cross-sectional view of the transmission in an enlarged view.

As illustrated in FIG. 1 and FIG. 4, disk 3 has an uninterrupted hole situated in its center, e.g., a bore hole, and a radially extending depression, e.g., a groove. The depression extends from the hole to the radially outer edge of disk 3.

In this manner, lubricating oil is radially conveyable from the hole farther toward the outside in the radial direction during a rotary motion of disk 3.

The disk is made from steel and is subjected to a nitriding treatment so that the coefficient of friction is reduced in relation to the two sun gears 30, 33 touching disk 3. In addition, the disk is hardened as a result and more difficult to deform.

The disk is accommodated in a centrally disposed, axially uninterrupted recess of planet-gear carrier 2.

Disk 2 is, for example, retained in planet-gear carrier 2 by force locking, e.g., with the aid of a snap ring.

Figure 3:
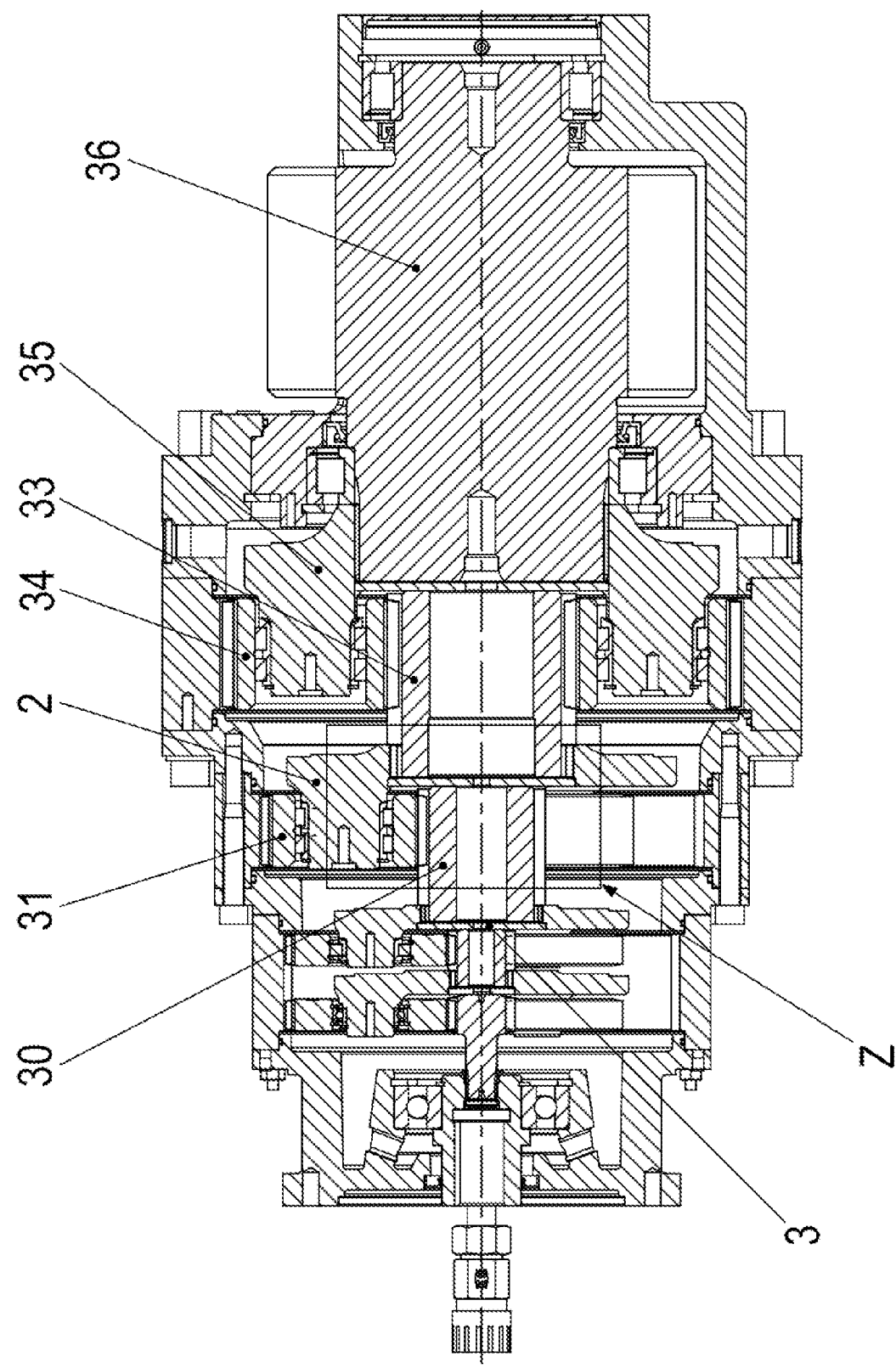
FIG. 3 is a cross-sectional view of the transmission.

As illustrated in FIGS. 3 and 4, first sun gear 30 is driven, e.g., by upstream gear stages, especially planetary transmission stages, and meshes with first planets 31, which are mounted on planet bolts 1 connected to planet-gear carrier 2 in a positive manner or are integrally provided therewith.

Planet-gear carrier 2 drives a second sun gear 33 to which it is connected at least in a torsionally fixed manner or with which it is integrally formed.

Second sun gear 33 meshes with second planets 34, which, in turn, are mounted on bolts that are positively connected to second planet-gear carrier 35 or are integrally formed therewith.

Second planet-gear carrier 35 drives an output shaft 36 of the transmission, which, however, may also be arranged as an input shaft of an output transmission stage.

As a result, disk 3 is accommodated in planet-gear carrier 2 and situated axially between first sun gear 30 and second sun gear 33. This prevents direct contact between the two sun gears 30, 33.

Since it is furthermore the case that the oil entering centrally in disk 2 is carried away in the radial direction, better lubrication is achievable, e.g., of planets 31.

First planets 31 mesh with a first internally toothed ring gear in each case, which also functions as a housing part.

Second planets 34 mesh with a second internally toothed ring gear in each case, which also functions as a further housing part.

The internally toothed ring gears are tightly connected to each other, i.e., with a high degree of protection, e.g., with the aid of screws.

The centrally placed, axially uninterrupted recess of planet-gear carrier 2 is, for example, arranged as a stepped bore so that disk 3 rests against a step of the stepped bore. Since first sun gear 30 has steel on its end face, e.g., in the contact region of disk 3, first sun gear 30 thus has a low coefficient of friction in relation to the nitrided disk 3.

Since second sun gear 33 has steel on its end face, e.g., in the contact region of disk 3, second sun gear 33 thus has a low coefficient of friction in relation to nitrided disk 3.

The two sun gears 30, 33 are thereby prevented from becoming welded together.

The two sun gears 30, 33 are arranged as hollow parts. Thus, they have an axially uninterrupted recess in each case, e.g., a bore hole, which is situated in the center.

Because the depression is restricted by disk 3 and by first sun gear 30, the channel arranged in this manner leads from the hollow space of first sun gear 30 radially to the outside and terminates in the radial clearance range covered by the needle bearings of first planets 31.

The needle bearings are placed on bolts 1, and planets 31 are placed on the needle bearings. In addition, the lubricating oil conveyed in the radial direction through the channel also flows into the region of the gear teeth of planets 31.

Figure 2:
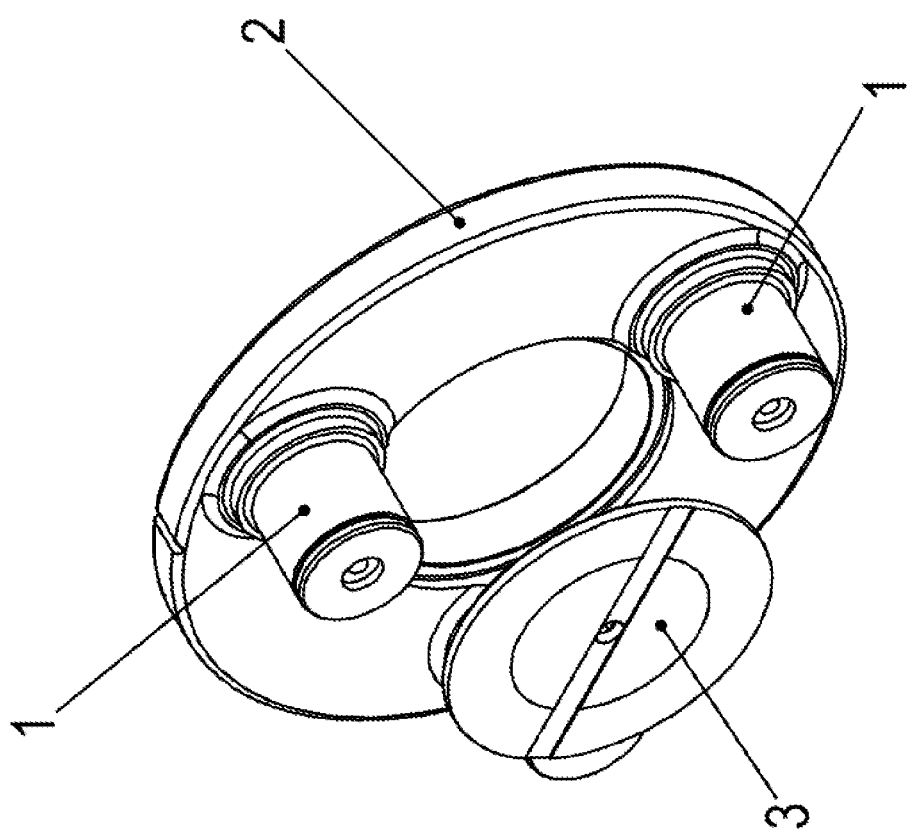
FIG. 2 is an exploded perspective view of disk 3 facing planet-gear carrier 2.

As illustrated in FIGS. 1 and 2, the channel is radially uninterrupted on both sides, i.e., at a first circumferential position from the centrally situated hole in the radially outward direction, and at a position shifted by 180° in the circumferential position, likewise from the centrally situated hole in the radially outward direction.

The channel cross-section is arranged independently of the radial clearance.

In further exemplary embodiments, three or more of such channels in disk 3 extending from the centrally situated hole in the radially outward direction are provided, the channels, e.g., being spaced apart from one another at regular intervals in the circumferential direction.

In further exemplary embodiments, the channel cross-section tapers with an increasing radial clearance. The oil therefore exits more steadily.

In further exemplary embodiments, the channel cross section initially becomes larger as the radial clearance increases and then decreases again. This ensures a steady oil flow at high speed because the enlarged channel cross-section acts as a buffer and is exposed to a high centrifugal force on account of the greater radial clearance. Even if the further oil flow through the hole has an irregular characteristic, a steady outflow is achievable.

As illustrated in the figures, the respective sun wheel shaft 30, 33 situated axially upstream and downstream from disk 3 has a hollow configuration and thus includes an axially uninterrupted bore. However, in further exemplary embodiments, one of the sun gear shafts may be implemented as a solid part, e.g., without an axially uninterrupted central recess. In this case, the lubricating oil is no longer able to flow from the sun gear shaft situated axially upstream from the disk through the hole of the disk to the sun gear shaft situated axially downstream from the disk, but must flow through the channel formed by the depression in the radially outward direction in order to allow for the lubrication of a bearing located there.

At a circumferential position, the respective planet-gear carrier has an axially uninterrupted notch, i.e., a radially directed depression on its outer circumference. Not only does that allow for better mixing of the lubricating oil and thus for a better thermal balance, but it also provides rpm-monitoring of the planet-gear carrier by a sensor, e.g., an inductive proximity sensor, which is situated in the housing of the transmission.

LIST OF REFERENCE CHARACTERS 1 bolt section
2 planet-gear carrier
3 disk
30 first sun gear
31 first planet
32 first planet-gear carrier
33 second sun gear
34 second planet
35 second planet-gear carrier
36 output shaft
Z cutaway

The invention claimed is:

1. A transmission, comprising:
   a first planetary transmission stage including a first planet-gear carrier having first bolts on which first planets that mesh with a first sun gear are rotatably mounted;
   a second planetary transmission stage including a second planet-gear carrier having second bolts on which second planets that mesh with a second sun gear are rotatably mounted, the first planet-gear carrier being connected to the second sun gear in a torsionally fixed manner; and
   a disk accommodated centrally in the first planet-gear carrier in a first recess arranged axially between the first sun gear and the second sun gear;
   wherein the first recess is arranged as an axially uninterrupted recess.

2. The transmission according to claim 1, wherein at least one of the sun gears is hollow.

3. The transmission according to claim 1, wherein the disk is arranged coaxially to at least one of the sun gears.

4. The transmission according to claim 1, wherein a radial clearance range covered by the disk includes and/or overlaps with a radial clearance range covered by the first sun gear.

5. The transmission according to claim 1, wherein the first planet-gear carrier includes an axially uninterrupted stepped bore, the disk resting against a first step of the stepped bore.

6. The transmission according to claim 5, wherein a bearing of a first planet rest against a second step of the stepped bore.

7. The transmission according to claim 1, wherein the disk is formed of nitrided steel.

8. The transmission according to claim 1, wherein the disk includes a centrally arranged, axially uninterrupted hole.

9. The transmission according to claim 1, further comprising:
   a third planetary transmission stage including a third planet-gear carrier having third bolts on which third planets that mesh with a third sun gear are rotatably mounted, the third planet-gear carrier being connected to the first sun gear in a torsionally fixed manner; and
   a further disk centrally accommodated in the third planet-gear carrier in a second recess and is arranged axially between the first sun gear and the third sun gear;
   wherein the third sun gear is arranged as a solid part.

10. The transmission according to claim 9, wherein the second recess is arranged as an axially uninterrupted recess.

11. The transmission according to claim 9, wherein the third sun gear is not hollow.

12. The transmission according to claim 9, wherein (a) the further disk is arranged coaxially to the first and/or the third sun gear, (b) a radial clearance range covered by the further disk includes and/or overlaps with a radial clearance range covered by the third sun gear, (c) the further disk is retained in the third planet-gear carrier by force locking and/or with the aid of a further snap ring, (d) the third planet-gear carrier includes an axially uninterrupted further stepped bore, (e) the further disk rests against a first step of the further stepped bore, (f) a bearing of a third planet rests against a second step of the further stepped bore, (g) the further disk is formed of nitrided steel, and/or (h) the further disk includes a centrally situated, axially uninterrupted hole.

13. The transmission according to claim 9, wherein (a) at least one further depression arranged on a side of the further disk facing the third sun gear and extend from the centrally situated, axially uninterrupted further hole to a radially outer edge of the further disk, (b) the further depression forms a further channel restricted by the further disk and the third sun gear, (c) a plurality of the further depressions are set apart from one another at regular intervals in a circumferential direction, (d) a channel cross-section of the further channel initially increases as a radial clearance becomes larger and then decreases, and/or (e) a hole of the further disk terminates in the further depression so that lubricating oil entering through the hole of the further disk is conveyed through the further channel in a radially outward direction rather than axially through the third sun gear.

14. A transmission, comprising:
a first planetary transmission stage including a first planet-gear carrier having first bolts on which first planets that mesh with a first sun gear are rotatably mounted;
a second planetary transmission stage including a second planet-gear carrier having second bolts on which second planets that mesh with a second sun gear are rotatably mounted, the first planet-gear carrier being connected to the second sun gear in a torsionally fixed manner; and
a disk accommodated centrally in the first planet-gear carrier in a first recess arranged axially between the first sun gear and the second sun gear;
wherein the disk is retained in the first planet-gear carrier by force locking and/or with the aid of a snap ring.

15. A transmission, comprising:
a first planetary transmission stage including a first planet-gear carrier having first bolts on which first planets that mesh with a first sun gear are rotatably mounted;
a second planetary transmission stage including a second planet-gear carrier having second bolts on which second planets that mesh with a second sun gear are rotatably mounted, the first planet-gear carrier being connected to the second sun gear in a torsionally fixed manner; and
a disk accommodated centrally in the first planet-gear carrier in a first recess arranged axially between the first sun gear and the second sun gear;
wherein the disk includes a centrally arranged, axially uninterrupted hole; and
wherein at least one depression is provided on a side of the disk facing the first sun gear and extend from the centrally situated, axially uninterrupted hole to a radially outer edge of the disk.

16. The transmission according to claim 15, wherein the depression forms a channel that is restricted by the disk and the first sun gear.

17. The transmission according to claim 15, wherein a plurality of the depressions are set apart from one another at regular intervals in a circumferential direction.

18. The transmission according to claim 16, wherein a cross-section of the channel initially becomes larger as a radial clearance increases and then decreases.

19. The transmission according to claim 16, wherein the disk includes a centrally arranged, axially uninterrupted hole that terminates in the depression and/or in the channel, so that lubricating oil that enters through the hole is conveyed through the channel in a radially outward direction.

20. A transmission, comprising:
a first planetary transmission stage including a first planet-gear carrier having first bolts on which first planets that mesh with a first sun gear are rotatably mounted;
a second planetary transmission stage including a second planet-gear carrier having second bolts on which second planets that mesh with a second sun gear are rotatably mounted, the first planet-gear carrier being connected to the second sun gear in a torsionally fixed manner; and
a disk accommodated centrally in the first planet-gear carrier in a first recess arranged axially between the first sun gear and the second sun gear;
wherein at least one of the planet-gear carriers has, on a radial outer circumference in a circumferential position and/or in a first circumferential angular range, a radially inwardly directed depression and/or a notch having an axially uninterrupted configuration.

* * * * *

UNITED STATES PATENT AND TRADEMARK OFFICE
CERTIFICATE OF CORRECTION

| | |
|---|---|
| PATENT NO. | : 11,359,700 B2 |
| APPLICATION NO. | : 17/277517 |
| DATED | : June 14, 2022 |
| INVENTOR(S) | : Elvia Cristiano De Morais and Antonio Ventriglia Vieira |

It is certified that error appears in the above-identified patent and that said Letters Patent is hereby corrected as shown below:

On the Title Page

Item (72) should read:
--Elvis Cristiano De Morais, Indaiatuba-SP (BR); Antonio Ventriglia Vieira, Salto-SP (BR)--

Signed and Sealed this
Tenth Day of October, 2023

*Katherine Kelly Vidal*

Katherine Kelly Vidal
*Director of the United States Patent and Trademark Office*